(12) United States Patent
Liu et al.

(10) Patent No.: US 9,002,808 B1
(45) Date of Patent: Apr. 7, 2015

(54) USING A WEB APPLICATION AS THE DEFAULT HANDLER OF LOCAL CONTENT

(75) Inventors: Kan Liu, Mountain View, CA (US); Zelidrag Hornung, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 38 days.

(21) Appl. No.: 13/467,739

(22) Filed: May 9, 2012

Related U.S. Application Data

(63) Continuation-in-part of application No. 13/369,893, filed on Feb. 9, 2012.

(60) Provisional application No. 61/484,192, filed on May 9, 2011.

(51) Int. Cl.
*G06F 7/00* (2006.01)
*G06F 17/30* (2006.01)
*G06F 3/048* (2013.01)

(52) U.S. Cl.
CPC .......... *G06F 17/30126* (2013.01); *G06F 3/048* (2013.01)

(58) Field of Classification Search
CPC .................................. G06F 7/00; G06F 17/30
See application file for complete search history.

(56) References Cited

U.S. PATENT DOCUMENTS

| | | | | |
|---|---|---|---|---|
| 5,991,760 A | * | 11/1999 | Gauvin et al. .......................... | 1/1 |
| 5,995,756 A | * | 11/1999 | Herrmann ...................... | 717/178 |
| 6,236,996 B1 | * | 5/2001 | Bapat et al. ............................ | 1/1 |
| 2007/0174824 A1 | * | 7/2007 | Relyea et al. .................. | 717/140 |
| 2008/0147671 A1 | * | 6/2008 | Simon et al. ..................... | 707/10 |
| 2010/0287219 A1 | * | 11/2010 | Caso et al. ..................... | 707/827 |

OTHER PUBLICATIONS

Goscincki et al., "Toward dynamic and attribute based publication, discovery and selection for cloud computing", Future Generation Computing Systems 26, pp. 947-970, Elsevier, Apr. 2010.*
Spillner et al., "Information Dispersion over Redundant Arrays of Optimal Cloud Storage for Desktop Users", Fourth International Conference on Utility and Cloud Computing, pp. 1-8, IEEE, 2011.*
Zhang et al., "Dynamic Access Control for Grid Applications", Proceedings of the Fourth International Workshop on Grid Computing (GRID'03), pp. 101-108, 2003, IEEE.*
Reis et al., "Browser Security: Lessons from Google Chrome", Queue—Distributed Computing, vol. 7, Issue 5, Jun. 2009, ACM.*

(Continued)

*Primary Examiner* — Michael Hicks
(74) *Attorney, Agent, or Firm* — Brake Hughes Bellermann LLP

(57) ABSTRACT

A method includes registering a web application, which is executable through a web browser, as a default file handler of a particular type of locally-stored files. A computing device provides a file manager interface that is configured to facilitate interaction, by a user, with a local filesystem of the computing device. The file manager interface receives a user selection of a file included in the local filesystem, where the file belongs to the particular type of files. Based on the user's selection, a user selectable action element is provided in the file manager interface to invoke the registered web application to handle the selected file. The file manager interface receives a user selection of the user selectable action element; and in response to the user selection of the user selectable action element the registered web application is automatically invoked to handle the selected file.

20 Claims, 7 Drawing Sheets

(56) References Cited

OTHER PUBLICATIONS

Kiselyov et al., "A Network File System over HTTP: Remote Access and Modification of Files and files", Proceedings of the FREENIX Track: 1999 USENIX Annual Technical Conference, 1999, The USENIX Association.*

"2nd USENIX Conference on Web Application Development (WebApps '11)", USENIX Association, Jun. 15-16, 2011, 156 pages.

* cited by examiner

| | NAME | TYPE | SIZE | DATE |
|---|---|---|---|---|
| | | | | |
| 430 | DOCS | FOLDER | | JANUARY 12, 2012 |
| 440 | PICTURES | FOLDER | | DECEMBER 1, 2011 |
| 450 | MUSIC | FOLDER | | JANUARY 5, 2012 |
| 460 | VIDEOS | FOLDER | | JANUARY 8, 2012 |

FIG.4A

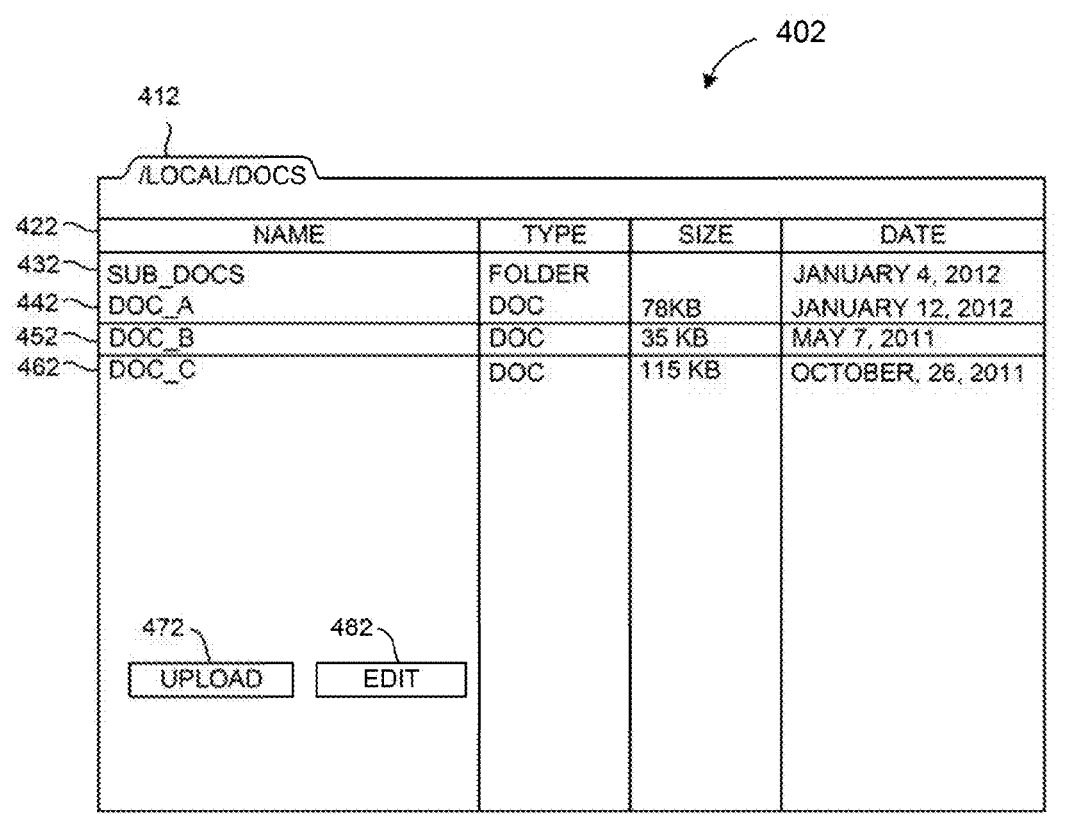

| NAME | TYPE | SIZE | DATE |
|---|---|---|---|
| SUB_DOCS | FOLDER | | JANUARY 4, 2012 |
| DOC_A | DOC | 78KB | JANUARY 12, 2012 |
| DOC_B | DOC | 35 KB | MAY 7, 2011 |
| DOC_C | DOC | 115 KB | OCTOBER, 26, 2011 |

FIG.4B

USING A WEB APPLICATION AS THE DEFAULT HANDLER OF LOCAL CONTENT

CROSS-REFERENCE TO RELATED APPLICATIONS

This is a continuation-in-part of U.S. patent application Ser. No. 13/369,893, filed on Feb. 9, 2012, and entitled, "SECURE LOCAL ACCESS BY REMOTE CONTENT". This application claims the benefit, under 35 U.S.C. §119(e), of U.S. Provisional Patent Application Ser. No. 61/484,192, filed on May 9, 2011, and entitled, "Using An Online Web Application As The Default Handler Of Local Content." The disclosure of each of the above referenced applications is incorporated by reference herein in its entirety.

TECHNICAL FIELD

This document relates, generally, to using a web application as the default handler of local content.

BACKGROUND

Use of the Internet and the World Wide Web continues to grow at a rapid pace. This growth is due, in part, to an increase in availability of data networks that computing device users may use to access the Internet and the World Wide Web. For instance, in addition to using conventional wired networks, computing device users may access the Internet and the World Wide Web through Wi-Fi hotspots and various types of wireless data networks, among a number of other possible approaches. These data access networks (e.g., for accessing the Internet and the World Wide Web) continue to become more readily available and provide ever increasing data bandwidth capabilities. Additionally, the variety of user computing devices that users may employ to connect with such data access networks continues to increase as well. Such devices may include personal computers, laptops computers and mobile computing devices (such as netbook computers, cellular phones, smartphones and tablet computers), as well as a number of other devices.

The increase in availability of data access networks, the corresponding increase in the capabilities of those networks and the increased variety of user computing devices have, at least in part, allowed for changes in how users interact with their computing device, as well allowing for changes in network-based (web-based) resources that are available to computing device users. One such change is the advent of web-based applications as compared to native applications. Another such change is an increase in the number and variety of resources (websites) that are available. These resources, as some examples provide computing device users with the ability to interact socially, share digital pictures, share videos and store data.

Generally, a web-based application is an application that is run within a Web browser on a computing device. Such web-based applications typically include both a client-side component (on the user device) and a server-side component (e.g., on a website or server corresponding with the web-based application), as compared to native applications that are locally installed on a computing device. Depending on the particular application, the client-side component may include only a brief description of the application, with the functionality of the web-based application being controlled by the server-side component, such as using code that is executable by a web browser, such as HTML, HTML5 and/or JavaScript, among a number of other alternatives (collectively Web-based coding technologies). Furthermore, websites that provide other web-based resources to computing device users, such as those described above, may also be implemented using Web-based coding technologies.

In order to provide security for computing device users' locally stored data when accessing remotely stored content, Web-based coding technologies either explicitly prohibit, or significantly restrict-access to local resources of user computing devices, such as general access to local filesystems. These restrictions reduce the risk of malicious activity, such as a virus being placed on a user's computer, or a malicious actor stealing personal information from a user's computer, as some examples. These security measures, however, also prohibit, or significantly restrict computing device users from providing remotely stored content (e.g., web-based applications and/or other web based content) access to locally stored information without using individual, dedicated interfaces for each web-based application or resource, which may be inconvenient.

SUMMARY

In a first general aspect, computer-implemented method includes registering a web application, which is executable through a web browser, as a default file handler of a particular type of locally-stored files. A computing device provides a file manager interface, where the file manager interface is configured to facilitate interaction, by a user, with a local filesystem of the computing device. The file manager interface receives a user selection of a file included in the local filesystem, where the file belongs to the particular type of files. Based on the user selection of the file of the particular type, a user selectable action element is provided in the file manager interface to invoke the registered web application to handle the selected file. The file manager interface receives a user selection of the user selectable action element; and in response to the user selection of the user selectable action element the registered web application is automatically invoked to handle the selected file.

Implementations can include one or more of the following features. For example, invoking the registered web application can include opening the web application in the web browser and opening the selected file in the web application. Invoking the registered web application can include opening the web application in the web browser and uploading the selected file to a server that hosts the web application.

The method can include determining that the selected file belongs to the particular type based on an extension of a name of the file. Registering the web application can include installing a web browser extension that registers the web application as the default file handler. The file manager interface can include a first sandboxed sub-process of a privileged web browser interface. Handling the selected file can include providing access to the selected file by the web application in a second sandboxed sub-process of the privileged web browser interface. Access to the one or more selected items by the remotely stored content can be provided in a sandboxed sub-process of the file manager interface. Providing the user selectable action element, receiving the user selection of the user selectable action element, and automatically invoking the registered web application to handle the selected file can be implemented by an extension of the file manager interface.

Providing the user selectable action element to invoke the registered web application to handle the selected file can include providing a plurality of action buttons corresponding with different registered web applications to invoke the registered web application to handle the selected file, and receiving the user selection of the user selectable action element can include receiving a user selection of one of the plurality of action buttons. The method can further include, in response to registering the web application, dynamically assigning the web application access permissions to files belonging to the particular type and which are accessible in the local filesystem. Invoking the registered web application can include opening the web application in the web browser, and the method can further include dynamically revoking the assigned access permissions in response to completion of the uploading of the selected file. The method can further include dynamically revoking the assigned access permissions in response to the user deselecting the selected file. The access permissions can be dynamically assigned and dynamically revoked by a privileged browser process of the computing device.

In another general aspect, a computing device includes a data storage device storing, files that are accessible via a local filesystem and a non-transitory computer-readable medium having instructions stored on it, where the instructions, when executed by a processor, cause at least one processor of the computing device to: register a web application, which is executable through a web browser executed by the computing device, as a default file handler of a particular type of locally-stored files; provide a file manager interface, the file tanager interface being configured to facilitate interaction, by a user, with the local filesystem; receive, by the file manager interface, a user selection of a file included in the local filesystem, where the file belongs to the particular type of files; based on the user selection of the file of the particular type, provide, in the file manager interface, a user selectable action element to invoke the registered web application to handle the selected file; receive, by the file manager interface, a user selection of the user selectable action element; and in response to the user selection of the user selectable action element, automatically invoke the registered web application to handle the selected file.

Implementations can include one or more of the following features. For example, the data storage device can include one or more of: a hard disk drive; a network share; a solid-state disk; and a peripheral data storage device. The peripheral storage device can include one of Universal Serial Bus drive, a Secure Digital memory card, a digital camera and a digital media player.

In another general aspect, a non-transitory, machine-readable medium has instructions stored on it, where the instructions, when executed by a processor; cause a computing device to: register a web application, which is executable through a web browser, as a default file handler of a particular type of locally-stored files; provide, by the computing device, a file manager interface, the file manager interface being configured to facilitate interaction, by a user, with a local filesystem of the computing device, receive, by the file manager interface, a user selection of a file included in the local filesystem, wherein the file belongs to the particular type of files; based on the user selection of the file of the particular type, provide, in the file manager interface, a user selectable action element to invoke the registered web application to handle the selected file; receive, by the file manager interface, a user selection of the user selectable action element; and in response to the user selection of the user selectable action element, automatically invoking the registered web application to handle the selected file.

Implementations can include one or more of the following features. For example, invoking the registered web application can include opening the web application in the web browser and uploading the selected file to a server that hosts the web application. The file manager interface can include a first sandboxed sub-process of a privileged web browser interface and handling the selected file can include providing access to the selected file by the web application in a second sandboxed sub-process of the privileged web browser interface.

BRIEF DESCRIPTION OF THE DRAWINGS

FIG. 4A is a diagram illustrating a file manager interface in accordance with an example implementation.

FIG. 4B is a diagram illustrating another file manager interface in accordance with an example implementation.

Like reference symbols in the various drawing indicate like elements.

DETAILED DESCRIPTION

Figure 1:
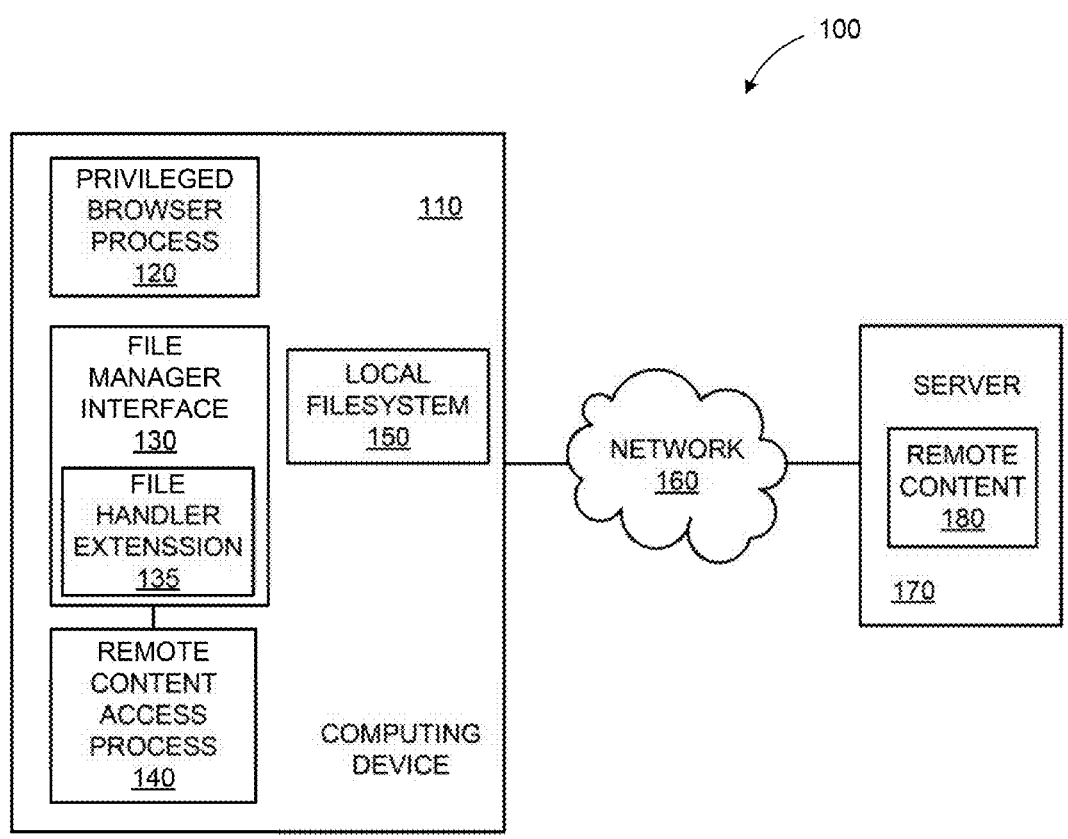
FIG. 1 is a block diagram illustrating a computing network in accordance with an example embodiment.

This document describes systems and techniques for using a web application as a default handler of local content and relates to providing web applications, e.g., remotely stored web applications, secure access to locally stored data files of a local filesystem implemented on a computing device. For purposes of this disclosure, a local filesystem of a given computing device may include information (e.g., file allocation tables and/or data files) that is accessible, either directly or indirectly, to a user of the given computing device. Such a local filesystem may be a subset of a larger filesystem (e.g., an operating system filesystem), where the larger filesystem includes content that is not typically accessible to user of the computing device. Such inaccessible content may include, for example, operating system binaries and device drivers, as well as other information that is not accessible to users of a given computing device. As described herein, such local filesystems may be implemented across a number of devices (e.g., hard disk drives, solid-state disks, optical disks, network shares and/or one or more peripheral devices) that are locally mounted and shared on a given computing device.

A web browser executed by a client device can receive code (e.g., HTML code and Javascript) from a remote server (e.g., a remote server that hosts a website) and can execute the received code on the client device for the benefit of a user of the client device.

In various implementations, the web browser may include or be associated with one or more web applications. In this context, a "web application" may be configured to perform a single task or multiple tasks for a user. In such an implementation, the web application may be configured to be executed or interpreted by the web browser. This is compared with native applications that include machine executable code and are configured to be executed directly by a processor or via the operating system of the client device, whereas, a web application may be incapable of execution or display without the aid of the web browser. Thus, web applications can be run inside a browser with a dedicated user interface, and may provide functionality and an experience that is more rich and interactive than a standalone website but are less cumbersome and monolithic than a desktop application. Examples of web applications include games, photo editors, and video players that are run inside the browser.

Web applications can be "hosted web applications", "installable web applications," or "packaged web applications." Hosted web applications may include at least a portion of a web site that itself includes web pages, plus some metadata that may be especially pertinent to the web application or to the user of the web application to allow the web application to perform some particular functionality for the user.

Installable web applications are a way of making a browser treat certain websites like applications. Many installable web applications are hosted web applications with extra metadata (such as a small manifest file that describes the application). Packaged web applications are a type of installable web applications. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using extension application programming interfaces (APIs), allowing packaged apps to change the way the browser behaves or looks.

In various examples, the web browser may include or be configured to interact with one or more browser extensions. In this context, a "browser extension" may include one or more web pages packaged or grouped together as a definable whole, and configured to extend the functionality to the web browser. As described herein, "browser extensions" are small software programs that can modify and enhance the functionality of a web browser. They may be written using web technologies such as HTML, JavaScript, and CSS. Extensions may have little or no user interface. Extensions may provide a user interface icon or other user interface that may modify a browser's "chrome", which is defined herein to include an area outside of a webpage displayed in the browser (such as the borders of a web browser window, which include the window frames, menus, toolbars and scroll bars). Installation of an extension also may be used to extend the functionality of a browser, e.g., to grant permission to the browser, or web applications executed by the browser, to perform actions that would ordinarily be forbidden, but for the installation of the extension.

Thus, browser extensions also provide extra functionality to a browser, but generally, unlike web applications, there is little or no user interface component to the functionality provided by an extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, an extension may be installed to embed a "mail this" button next to every link in every page. Compared to web applications, extensions generally cut across websites and web applications. Extensions are usually in effect across all websites (though some are site-specific). Web applications do not combine with other apps in this way. Rather, web applications run standalone, like any regular website. Packaged web applications and installable web applications are also different from browser extensions because they present very different user interfaces.

"Packaged web applications", in contrast to browser extensions, may look and feel like regular web applications, with a big-screen design and rich user interface. Both extensions and packaged web applications may bundle all their files into a single file that a user downloads and installs. This bundling means that, unlike ordinary web applications, extensions and packaged web applications do not need to depend on content from the web. Browser extensions, packaged web applications, and installable web applications may be distributed via a trusted web store, or via individual websites.

Throughout this document, the terms browser application, secure browser process, privileged browser process, browser process, web browser and web browser application may be used interchangeably to refer to the same thing. A browser application may be an application configured to run on a computing device and render web content (both remote and local), such as web pages, web applications, and a file manager interface, as some examples. In an example implementation, content rendered by the browser application may be rendered in respective sub-processes of a secure browser process, where each sub-process runs separately from other sub-processes associated with the browser.

As is described herein, each of the browser sub-processes (e.g., a file manager interface and a remote content access process) that are used to provide a web application with remote content secure access to locally stored files may operate as a respective sandboxed sub-process of a privileged browser process. Alternatively, a remote content access process may operate as a sandboxed sub-process of the file manager interface. As the term is used herein, a sandboxed sub-process is an unprivileged process that is subject to, but isolated from a main, privileged browser process (e.g., the browser process that is able to access system resources), and is also isolated from an underlying operating system of a computing device on which the browser, application is implemented. In other implementations, a file manager interface and a file handler process, such as described herein, may operate as a sandboxed sub-processes of an underlying operating system. Sandboxing may be accomplished by a privileged browser process, for example, by limiting, or preventing access to the resources of the browser process, resources of the underlying operating system, and/or resources of the associated computing device (e.g., filesystems, system calls, etc.) by the sandboxed sub-processes. Sandboxed processes also may be isolated from one another, where any communication between different sandboxed processes may be facilitated by a privileged browser process.

Throughout this document, the terms extension and browser extension may be used interchangeably to refer to the same thing. The term extension may also be used to refer to an extension for a file manager interface. In one example, a browser extension may be delivered to a computing device for installation as an installation package that includes a zipped bundle of files (e.g., compressed, archive file) and a header that includes some metadata about the extension. A properly formed extension, when unpacked and installed in the browser, adds functionality to the browser application. Alternatively, in some implementations, such as those described herein, an extension may add functionality to a file manager interface instead of, or in addition to, adding functionality to the browser application. In some implementations, extensions may operate as webpages (e.g., may be implemented as local web content) and may have access to all of the application programming interfaces (APIs) that the browser application provides to webpages and/or web content.

The types of data files of an extension application that can make up a zipped file bundle of an extension installation package may include hypertext mark-up language (HTML), cascading style sheets (CSS), JavaScript, images, and other types of files including web-related computer language content and/or code, such as JavaScript Object Notation (JSON) objects. JSON objects that may be part of an extension installation package include a manifest data file and a catalog data file. In an example implementation, a manifest file may be a JSON-formatted file that includes a plurality of information fields that are used to define the corresponding extension. These fields may include a name field, a version field, as well as one or more fields that indicate any APIs the extension wishes to have access to.

For instance, in an example implementation, a file handler API may be provided in a computing device that allows an extension developer to extend the functionality of a file manager interface to provide browser-executed web applications (e.g., remotely stored web applications) with secure access to files stored in a local filesystem of the computing device (e.g., content that is directly or indirectly accessible by a user of the computing device through the file manager interface), such as using the techniques described herein. In such approaches, the manifest file for a given extension may indicate (declare) that it requires access to the file handler API in order to extend the functionality of, for instance, a file manager interface of an associated computing device.

A manifest file may also include fields that define the types of actions the extension will take in the browser and/or file manager interface, such as displaying icons or buttons, for example. A catalog file, in one example, may be a JSON-formatted file that includes a plurality of key-value pairs that may be used for internationalization of the browser extension included in its corresponding browser extension installation package.

In an example implementation, image files included in an extension installation package may include icons, as well as image files that are used by the extension when it is rendered in the browser and/or the file manager interface. The image files may be in a number of formats, such as ICO, GIF, JPG and PNG, among a number of other possible formats.

FIG. 1 is a block diagram illustrating a computing network 100 in accordance with an example implementation. The network 100 may be used to implement techniques, such as those described herein, that allow a computing device user to provide browser-executed web applications, e.g., remotely-hosted web applications with secure access to locally stored information (e.g., in a filesystem) of a computing device without using individual, dedicated interfaces for each web-based application or web-based resource that the user wishes to interact with. As shown in FIG. 1, the network 100 includes a computing device 110, a network 160 and a server 170. The computing device 110 and the server 170 may be configured to communicate via the network 160, which may be the Internet or the World Wide Web, as two examples.

As shown in FIG. 1, the computing device 110 includes a privileged browser process 120 (e.g., as discussed above), a file manager interface 130, a remote content access process 140 and a local filesystem 150 (e.g., user accessible content). In an example implementation, the file manager interface 130 may be implemented as a sandboxed sub-process of the privileged browser process 120. Further, the file manager interface 130 may produce a graphical user interface (GUI) on the computing device 110 that allows a user to interact with the local filesystem 150, such as by selecting file folders and/or data files that are included in the local filesystem 150 and/or performing and/or initiating other actions on the local filesystem 150, such a viewing a file, for example. In some implementations, the file manager interface 130 may implemented as local web content. In other implementations, the file manager interface may be implemented as a local, native application. Of course, a number of other approaches may also be used to implement the file manager interface 130.

In the computing device 110, the file manager interface 130 may include a file handler extension 135 that extends the functionality of the file manager interface 130 to allow a user to provide remotely stored content (e.g., websites and/or web-applications) secure access to locally stored information via the file manager interface 130. For instance, using the approaches described herein, the file handler extension 135 (e.g., in conjunction with an API of the privileged browser process 120) may allow a user to upload files included in the local filesystem 150 to a website (e.g., upload digital photos to a photo sharing site) without having to use a dedicated interface of the photo sharing site, where the website is included in remotely stored content 180 on the server 170. In other embodiments, the file handler extension 135 may allow a user to open a document file for editing using a web-based word processor application (e.g., remotely stored content 180) from the file manager interface 130, without having to use a dedicated interface of the web-based word processor application. In still other embodiments, the file handler extension 135 may allow a user to provide the remote content 180 secure access to the local filesystem 150 to perform other actions, such as create a new file or traverse sub-folders of a selected file folder, as two examples. It will be appreciated that the file manager interface 130 may include multiple file handler extensions, where each of the file handler extensions corresponds with a respective set of file types and respective remotely stored content.

In an example implementation, a user may install a given extension on the computing device 110, where the given extension extends the functionality of the privileged browser process 120 and/or the file manager interface 130 to allow for secure interaction with the remote content 180 in response to user actions in the file manager interface 130. As described herein, the remote content 180 may be, for example, a website or a web application. In this example, the given extension, as part of its manifest file, may declare a file handler API of the privileged browser process. 120, where the file handler API extends the functionality (e.g., adds functionality using the file handler extension 135) of the file manager interface 130.

The specific functionality that is to be added by the file handler extension 135 may be defined by files that are included in the given extension's installation package. For instance, a manifest file of the given extension may indicate one or more file types to which the added functionality corresponds. A manifest file for a web application that the user desires to install also may one or more file types to which the added functionality corresponds. The manifest file may also indicate one or more actions that may be performed on the file types to which it applies, as well as define buttons, icons, or other user selectable action elements (menu items, double-click responses or an in-place viewer/editor, as some examples) that may be selected to initiate respective corresponding actions. Additionally, the files of the given extension may also include an HTML file that implements respective functions for carrying out the one or more actions indicated in the manifest file. In such an approach, a user clicking a button or icon corresponding with a specific action indicated in the manifest file may result in the corresponding function in the HTML file being called.

Code for an example manifest file for a web application to register the web application as a default file handler for one or more particular types of files is shown below in Table 1.

TABLE 1

```
(1)   {
(2)     "name": "Picasa Uploader"
(3)     ...
(4)     "file_browser_handlers": [
(5)        {
(6)          "id": "upload",
(7)          "default_title": "Upload to Picasa", // What the button
               will display
(8)          "file_filters": [
(9)             "filesystem:*.jpg", // To match all files, use "filesystem:*.*"
(10)            "filesystem:*.jpeg",
(11)            "filesystem:*.png"
(12)         ]
(13)       }
(14)    ],
(15)    "permissions" : [
(16)       "fileBrowserHandler"
(17)    ],
(18)    "icons:" : { "16": "icon16.png",
(19)                 "48": "icon48.png",
(20)                 "128": "icon128.png" },
(21)    ...
(22)  }
```

It should be appreciated that the code shown in Table 1 can be part of a larger manifest for the web application and is shown here for example purposes only. Additionally, it should be appreciated that the code shown in Table 1 can be considered as code for a file handler extension 135 that can be part of the installation package for the web application and which extends the functionality of the file manger interface 130 for advantageous use by the web application. Thus, the code shown in Table 1 can be a code snippet of an extension of a larger body of code for the web application and is shown here to provide an example of how the web application can be registered as a default file handler for particular type(s) of locally-stored files, so that a user may advantageously use the web application as a default file handler for the particular type(s) of locally-stored files.

In the example manifest of Table 1, line 2 of the manifest allows a user, or a developer, of the web application to define a name the extension of the file manager interface 130. Line 4 of the manifest is the beginning of code that defines the functionality provided by the extension.

Line 6 of the manifest allows the user or the developer to define a function that can performed on locally stored files as a result of the installation of the extension shown in Table 1. Line 7 of the manifest allows the user or the developer to define a title of the extension that can be displayed in the file manager interface 130, e.g., in association with a button the user may select to initiate the function defined in line 6 of the manifest. Line 8 of the manifest allows the user or the developer to define types of files (e.g., those file types listed in lines 9, 10, and 11 of the manifest) that can be handled by the registered web application via the file manager interface 130 as a result of installation of the extension shown in Table 1. As shown in lines 9, 10, and 11 of the manifest, the types of files to be handled by the registered web application can be defined by the filename extension of the files. For example, files having the extensions "jpg", "jpeg", and "png" can be defined in lines 9, 10, and 11 as types of files to be handled by the web application. In other implementations, types of files can be defined by other attributes, e.g., their content (which may be determined based on their MIME type) or their location within a local filesystem (e.g., as defined by folders of the filesystem).

Line 15 of the manifest can allow the user or the developer to define the permissions that are granted to the web application upon installation of the extension shown in the manifest shown in Table 1. For example, line 16 of the manifest grants permission to the web application to use fileBrowserHandler extension, so that the web application can access locally-stored files of the types defined in lines 9, 10, and 11, through the file manager interface 130. Lines 18, 19, and 20 allow the user to define user interface elements for display in the file manager interface 130, which may be used by the user to access the functionality provided by the extension shown in Table 1.

For purposes of illustration and clarity, in the example implementations described herein, user selectable action elements are generally illustrated and described as action buttons. It will be appreciated, however, that other techniques, such as those indicated above, may be used to implement such user selectable action elements.

As an example, the manifest file of the given extension may specify an "upload" action that is to be applied to a particular type of files (e.g., digital image file types, in one implementation) including specifying text and/or an icon to display on a corresponding button for initiating the upload action. In such an approach, the user may select a digital image file in the file manager interface 130. In response to the selection of the digital image file within the file manager interface, the added functionality of the given extension may cause an "upload" button to be displayed in the file manager interface 130's GUI. The user then may click the upload button, which may call a corresponding HTML function that carries out the upload action for the selected image file to a corresponding web application. In the example shown in FIG. 1, the operations included in the HTML function that carries out the upload action may be performed by the remote content access process 140, which may be a sandboxed sub-process of the privileged browser process 120 or a sandboxed sub-process of the file manager interface 130.

Figure 2:
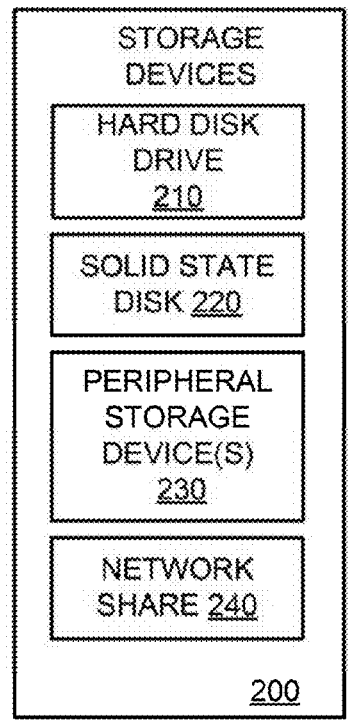
FIG. 2 is a block diagram illustrating data storage devices that may be included in the computing device of FIG. 1 in accordance with an example implementation.

FIG. 2 is a block diagram illustrating data storage devices 200 that may be included in the computing device 110 of FIG. 1 in accordance with in example implementation. In some implementations, the local filesystem 150 of the computing device 110 may be implemented using one or more of the devices included in the storage devices 200. As shown in FIG. 2, the data storage devices 200 may include a hard disk drive 2110, a solid state disk 220, one or more peripheral storage devices 230, and a network share 240. In an example implementation, the peripheral storage device(s) 230 may include one or more of a Universal Serial Bus drive, a Secure Digital memory card, a digital camera and a digital media player. Of course, in other implementations, the peripheral storage device(s) 230 may include other devices with data storage capabilities, such as an optical drive or an external storage drive, for example. It will be appreciated that the data storage devices 200 may include additional devices, fewer devices, or other types of data storage devices may be substituted for those shown in FIG. 2 and the specific devices included in the data storage devices 200 will depend, at least in part, on the configuration of a given computing device.

In an example implementation, each device of the storage device 200 may implement a file allocation table (FAT), which is used to index (map) where information is stored in the associated storage device. Each device of the data storage devices 200 may also implement one or more data storage partitions (that are indexed in the respective FAT), where the data storage partitions are used to store data files, such as in a hierarchical file folder structure. Other approaches may be used to implement the local filesystem 150 of the computing device 110. In the approaches described herein, web applications may be given permission (e.g., by a file handler extension) to access particular types of data files and/or specific portions of a FAT, where those permission is are limited by a specific action to be performed and may also be limited by the specific files and/or file folders that are selected by a user in connection with the specific action. For instance, if a user wants to upload a specific file in the local filesystem 150 to a web application using the file handler extension 135, the web application may only be given read access to that specific file and not given any access to a corresponding FAT.

Figure 3:
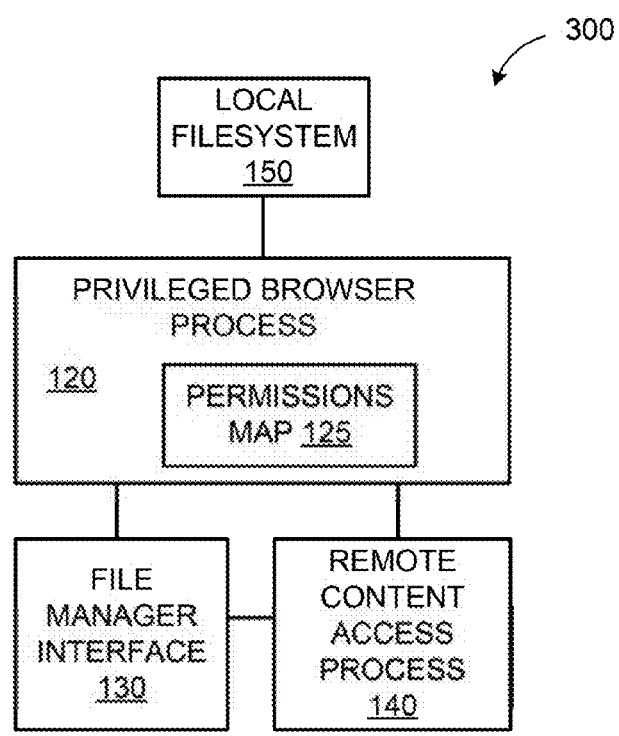
FIG. 3 is a block diagram illustrating a computing device 300 in accordance with an example implementation.

FIG. 3 is a block diagram illustrating a computing device 300 in accordance with an example implementation. As shown in FIG. 3, the computing device 300 includes like elements of the computing device 110 shown in FIG. 1. Specifically, the computing device 300 includes the privileged browser process 120, the file manager interface 130, the remote content access process 140 and the local filesystem 150. For purpose of brevity and clarity, the entirety of the details of these like elements, as was discussed above with respect to FIG. 1, is not repeated again with respect to the description of FIG. 3. However, some of those details are repeated with respect to the description of FIG. 3 in order to provide appropriate context.

As shown in FIG. 3, the privileged browser process 120 may be operationally coupled with the local filesystem 150, the file manager interface 130 and the remote content access process 140. In such an arrangement, as previously discussed, the file manager interface 130 and the remote content access process 140 may be respective sandboxed sub-processes of the privileged browser process 120. Alternatively, the remote content access process 140 may be a sandboxed sub-process of the file manager interface 130.

In the arrangement shown in FIG. 3, the privileged browser process 120 includes a permissions map 125. In an example implementation, the browser process 120 may be configured to assign access permissions for resources of the computing device 300, such as for items included in the local filesystem 150. In some implementations, the browser process 120 may keep track of assigned access permissions in the permissions map 125. Such access permissions may be assigned as part of the operation of a file hander extension, such as the file handler extension 135. In such arrangements, sandboxed sub-processes, such as the file manager interface 130 and the remote content access process 140 may only access resources of the computing device 300 in accordance with respective permissions assigned to them and listed in the permissions table 125.

For instance, using the previously discussed example of a user uploading a specific file in the local filesystem 150 to a website using the file handler extension 135 (not shown in FIG. 3), when the user clicks an upload button provided by the file handler extension 135, the privileged browser process 120 may dynamically assign the remote content access process 140 read-only access to the file being uploaded and update the permissions map 125 to reflect the assigned permission. In other situations, such as those described herein, other permissions may be assigned. For instance, the file handler extension process 135 may be configured to assign access permissions that are appropriate for a given action to be performed by the remote content 180 (e.g., read and write permissions for a file that is to be edited).

In the above example, once the read-only access is assigned, the web application (i.e., the remote content) that the selected file is being uploaded to may access the file via the remote content access 140 process, which now has permission to read the file. Once the selected file is uploaded, the privileged browser process 120 may dynamically revoke the read-only access of the remote content access process 140 to the selected file and update the permissions map to remove the previously assigned permission. Further, once the selected file is uploaded, the privileged browser process 120 may terminate the remote content process 140. It will be appreciated that the exact permissions that are assigned and the items to which those permissions are assigned will depend, at least, on the particular situation and the action being performed by the file handler extension 135.

FIG. 4A is a diagram illustrating a GUI of a file manager interface 400 in accordance with an example implementation. The file manager interface 400 shown in FIG. 4A illustrates an example implementation of a file handler extension, such as the file handler extension 135. The particular implementation shown in FIG. 4A is liven for purposes of illustration and by way of example. It will be appreciated that similar techniques may be used to implement file handler extensions that perform other operations and that similar techniques may be applied for the other items listed in the file manager interface 400. It will also be appreciated that other configurations may be used to implement the file manager interface 400.

As shown in FIG. 4A, the file manager interface 400 includes a tab 410 that indicates a specific location in a filesystem of a computing device such as the local filesystem 150 shown in FIG. 1. In this instance, the tab 410 indicates "/local" as being illustrative that this example is discussed herein with reference to the local filesystem 150 shown in FIG. 1. The file manager interface 400 also includes column headings in row 420, which include "Name", "Type", "Size" and "Date." The column headings in row 420 signify data file and/or file/folder properties for items associated with (included in) the current location (file folder) 410 of the local filesystem 150 and are respectively listed in those columns for each item, as appropriate.

In the arrangement shown in FIG. 4A, files that are included in the current location "/local" of the local filesystem 150 are listed in rows 430, 440, 450 and 460. The listed files include four file folders, respectively, a "DOCS" file folder, a "PICTURES" file folder, a "MUSIC" file folder and a "VIDEOS" file folder. Each of these items is indicated as type "FOLDER" in the Type column from row 420. In FIG. 4A, the DOCS file folder is indicated as being selected, such as may be accomplished by a user selecting the DOCS file folder 430 with a pointing device (not shown). Based on the user's selection of the DOCS file folder, a file handler extension, such as the file handler extension 135, may extend the functionality of the file manager interface 400, using the techniques described herein, so as to provide action buttons 470 and 480 in the file manager interface 400. As shown in FIG. 4A, the action button 470 is labeled "UPLOAD" while the action button 480 is, labeled as "CREATE."

In this example, the file handler extension 135, e.g., in a manifest file, may associate files with type "FOLDER" with the "UPLOAD" button 470 and "CREATE" button 480, where a user selecting either of those buttons results in a respective corresponding function being called that carries out an associated action on the selected item (or items). In other implementations, the action buttons 470 and 480 may be defined in respective manifest files of different file handler extensions.

In one example, if a user selects the UPLOAD button 470 after selecting the DOCS file folder, a function may be called that uploads any data files in the DOCS file folder to a web-based data storage service. In this example, a remote content access process, such as the remote content access process 140, may be launched. That remote content access process may then be dynamically assigned read-only permissions for any data file included in the DOCS file folder, such as by a privileged browser process and the assigned permissions may be included in an associated permissions table, such as described herein. Additionally, in certain implementations, the remote content access process may also be assigned read-only permission for data files that are included in sub-folders of the DOCS file folder.

After data files from the DOCS file folder are uploaded in accordance with the function that is called by selection of the UPLOAD button 470, the read-only permission for data files in the DOCS file folder (and sub-folders, if appropriate) may be dynamically revoked by a privileged browser process (and removed from an associated permissions table). In other implementations, the read-only permission may be dynamically revoked when the user deselects the DOCS file folder. Such approaches may allow remotely stored content (the web-based data storage service) limited (read-only) access only to the files it is uploading, thus avoiding exposing the entire filesystem to the remote content and, accordingly, reducing potential security risks.

In another example, if a user selects the CREATE button 480 after selecting the DOCS file folder, a function of a file handler extension may be called that allows the user to create a new document file in the "DOCS" file folder using a web-based word processing application. In this example, a remote content access process, such as the remote content access process 140, may be launched, and that process may be dynamically assigned file creation and deletion permission for the "DOCS" file folder, such as by a privileged browser process, where the file creation and deletion permission is included in an associated permissions table. Such file creation and deletion permission may also implicitly include read and write access for the DOCS file folder. Additionally, in some implementations, the remote content access process may also be assigned file creation and deletion permission for sub-folders of the DOCS folder.

After creating a new document file, such as in accordance with the function that is called by selection of the CREATE button 480 (e.g., after saving and closing the new document), the file creation and deletion permission for the DOCS file folder (and sub-folders, if appropriate) may be dynamically revoked by a privileged browser process and removed from an associated permissions table. In other implementations, the file creation and deletion permission may be dynamically revoked when the user deselects die DOCS file folder. Such approaches allow a web application (e.g., the web-based word processor web application) limited file creation and deletion permission (access) to only the DOCS file folder (which may include sub-folders), thus avoiding exposing the entire filesystem, including a parent file folder of the DOCS file folder, to the remote content and, as a result, reducing potential security risks.

FIG. 4B is a diagram illustrating another GUI of a file manager interface 402 in accordance with an example implementation. In like fashion as the file manager interface 400, the file manager interface 402 illustrates an example implementation of a file handler extension, such as the file handler extension 135. As with FIG. 4A, the particular implementation shown in FIG. 4B is given for purposes of illustration and by way of example. It will be appreciated that similar techniques may be used to implement file handler extensions that perform other operations and that similar techniques, such as those described above and those described hereinafter, may be applied for each of the items listed in the file manager interface 402. It will also be appreciated that other configurations may be used to implement the file manager interface.

As shown in FIG. 4B, the file manager interface 402 includes a tab 412 that indicates a specific location in a filesystem of a computing device, such as the local filesystem 150 shown in FIG. 1. In this instance, the tab 412 indicates "/local/DOCS", which may be the DOCS file folder discussed above with respect to row 430 in FIG. 4A. In like fashion as the file manager interface 400, the file manager interface 402 also includes column headings in row 422, which include the "Name", "Type", "Size" and "Date" attribute headings.

In the arrangement shown in FIG. 4B, items that are included in the DOCS file folder are listed in rows 432, 442, 452 and 462. The listed items include, respectively, a SUB_DOCS file folder and three document files, "DOC_A", "DOC_B" and "DOC_C." The SUB_DOCS file folder is indicated as Type FOLDER and each of the document files is indicated as Type DOC in the Type column from row 422. In FIG. 4B, DOC_B is indicated as being selected, such as selected by a user. Based on a user's selection of DOC_B, a file handler extension, such as the file handler extension 135, may extend the functionality of the file manager interface 402, using the techniques described herein, so as to provide action buttons 472 and 482 in the file manager interface 402. As shown in FIG. 4A, the action button 472 is labeled "UPLOAD" while the action button 482 is labeled as "EDIT."

In this example, the file handler extension 135, e.g., in a manifest file, may associate file in a local filesystem that belong to the "DOC" type with the UPLOAD button 472 and the EDIT button 482, where a user selecting either of those buttons results in a respective corresponding function being called that carries out an associated action on the selected item (or items). Files that belong to the "DOC" type can be determined based on a filename extension of the file. For examples, all files having a name "*.doc", which "*" represents is a wildcard character may be determined to belong to the "DOC" type. In other implementations, rather than using the filename extension to determine the type of a selected file, the content of a selected file (i.e., MIME type) may be used (e.g., by the file handier extension 135) the type to which the selected file belongs and to determine available actions for the selected file.

Depending on the particular implementation, the function associated with the UPLOAD button 472 may be the same function that is associated with the UPLOAD button 470, or it may be a different function that is defined in a different file handler extension. Depending on the particular implementation, the action buttons 472 and 482 may be defined in a manifest file of a single file handler extension, or they may be defined in respective manifest files of different file handler extensions.

In one example, if a user selects the UPLOAD button 472 after selecting DOC_B, a function may be called that uploads DOC_B to a web-based data storage service. In this example, a remote content access process, such as the remote content access process 140, may be launched. That remote content access process may then be dynamically assigned read-only permission for only DOC_B, such as by a privileged browser process and the assigned permission may be included in an associated permissions table.

After uploading DOC_B in accordance with the function that is called by selection of the UPLOAD button 472, the read-only permission for DOC_B may be dynamically revoked by a privileged browser process (and removed from an associated permissions table). In other implementations, the read-only permission may be dynamically revoked when the user deselects DOC_B. Such approaches may allow remotely-stored content (the web-based data storage service) limited (read-only) access only to DOC_B, thus avoiding exposing the entire filesystem, including any of the file folders (e.g., as indexed or mapped in an associated FAT) to the remote content and, as a result, reducing potential security risks.

In another example, if a user selects the EDIT button 482 after selecting the DOCS file folder, a function may be called that allows the user to edit DOC_B using a web-based word processing web application. In this example, a remote content access process, such as the remote content access process 140, may be launched and that process may be dynamically assigned read and write permission for DOC_B, such as by a privileged browser process, where the read and write permission is included in an associated permissions table.

After editing DOC_B, such as in accordance with the function that is called by selection of the EDIT button 482 (e.g., after saving and/or closing DOC_B), the read and write permission for DOC_B may be dynamically revoked by a privileged browser process and removed from an associated permissions table. In other implementations, the read and write permission may be dynamically revoked when the user deselects DOC_B in the file manager interface 402. Such approaches allow remotely stored content (e.g., the web-based word processor) read and write access to only DOC_B, thus avoiding exposing the entire filesystem, including a parent file folder of the DOCS file folder (or any of an associate FAT), to the remote content and, as a result, reducing potential security risks.

Figure 5:
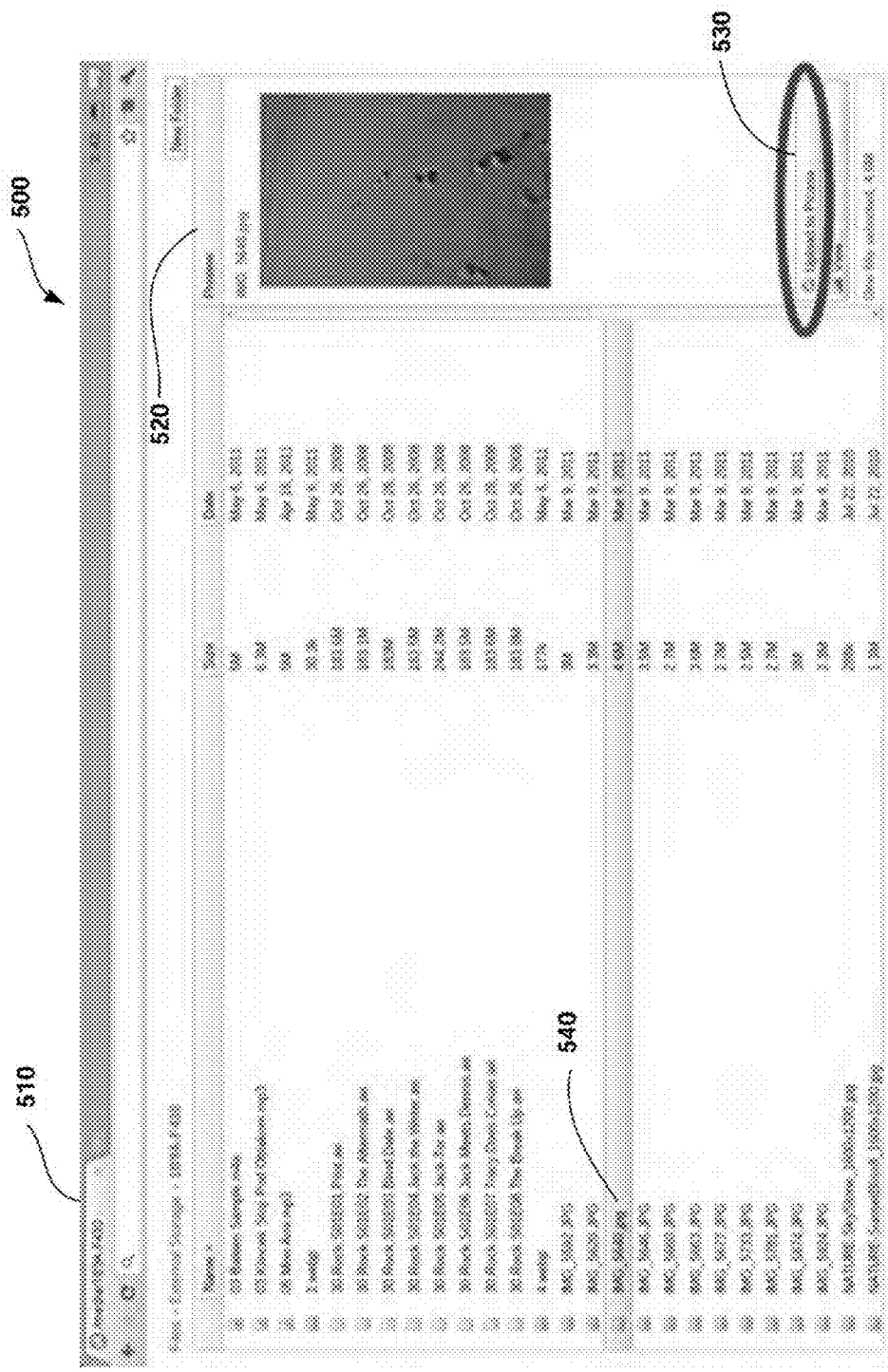
FIG. 5 is a diagram illustrating another file manager interface in accordance with an example implementation.

FIG. 5 is a diagram illustrating a GUI of a file manager interface 500 in accordance with an example implementation. The file manager interface 500 shown in FIG. 5 illustrates an example implementation of a file handler extension, such as the file handler extension 135. As with FIGS. 4A and 4B, the particular implementation shown in FIG. 5 is given for purposes of illustration and by way of example.

As shown in FIG. 5, the file manager interface 500 includes a tab 510 that indicates a specific location in a filesystem of a computing device, such as the local filesystem 150. In this instance, the tab 510 indicates "/media/189A-F430", which may be a variety of different media files and a variety of different types of media files. In like fashion as the file manager interface 400, the file manager interface 500 also includes column headings in row 520, which include the "Name", "Size" and "Date" attribute headings. The file manager interface 500 also includes a "Preview" pane 520 that may be used to preview the display of one or more media files whose attributes are listed in the Name, Size, and Date columns of the interface 500.

In the arrangement shown in FIG. 5, different files, along with their attributes, are listed in rows of the interface 500. The interface 500 also includes a user selectable action element 530 that can be used to invoke a registered web application to handle a file that is selected from the files displayed in the interface 500. As shown in FIG. 5, user selectable action element 530 is labeled "Upload to Picasa."

In this example, the file handler extension 135, e.g., in a manifest file, such as the manifest file shown in Table 1, may associate one or more user-selected files in a local filesystem that belong to the "jpg" type with the "Upload to Picasa" button 330, where a use's selection of button 530 results in a respective corresponding function being called that carries out an associated action on the selected item (or items). Files that belong to the "jpg" type can be determined based on a filename extension of the file. For examples, all files having a name "*.jpg", which "*" represents is a wildcard character may be determined to belong to the "jpg" type.

The "Upload to Picasa" button 530 may be defined in a manifest file of a file handler extension, such as the manifest file shown in Table 1. A user can select one or more locally-stored files that belong to a particular type of file that is defined in a manifest. For example, as shown in FIG. 5, the file "IMG_5640.jpg" is shown as having been selected by a user by virtue of it being highlighted within the plurality of files shown in the interface 500. If a user selects the "Upload to Picasa" button 530 after selecting "IMG_5640.jpg", a web application that has been registered by installation of the file handler extension 130 may be automatically invoked to handle the selected file. For example, by selecting the "Upload to Picasa" button 530 after selecting "IMG_5640.jpg", the file IMG_5640.jpg may be automatically uploaded to a picasa.com web application, which may provide photo editing or photo organizational tools.

By selecting one or more files displayed in the file manager interface 500 and selecting the user-selectable action element 530, a remote content access process, such as the remote content access process 140, may be launched. That remote content access process may then be dynamically assigned appropriate local file access permission(s) for only the selected one or more files, where the permission(s) depend on the requested privileges requested in the manifest. For example, in some implementations the remote content access process may be assigned read-only permission for the selected files. The dynamic assignment of the appropriate file access permission(s) can be assigned by a privileged browser process and the assigned permission(s) may be included in an associated permissions table.

After uploading IMG_5640.jpg to the Picasa web application in accordance with the function that is called by selection of the "Upload to Picasa" button 530, the local file access permission(s) for IMG_5640.jpg may be dynamically revoked by a privileged browser process (and removed from an associated permissions table). In other implementations, the local file access permission(s) may be dynamically revoked when the user deselects IMG_5640.jpg. Such approaches may allow remotely stored content (e.g., a web-based data storage service) limited (e.g., read-only) access only to IMG_5640.jpg, thus avoiding exposing the entire filesystem, including any of the file folders (e.g., as indexed or mapped in an associated FAT) to the remote content and, as a result, reducing potential security risks.

Figure 6:
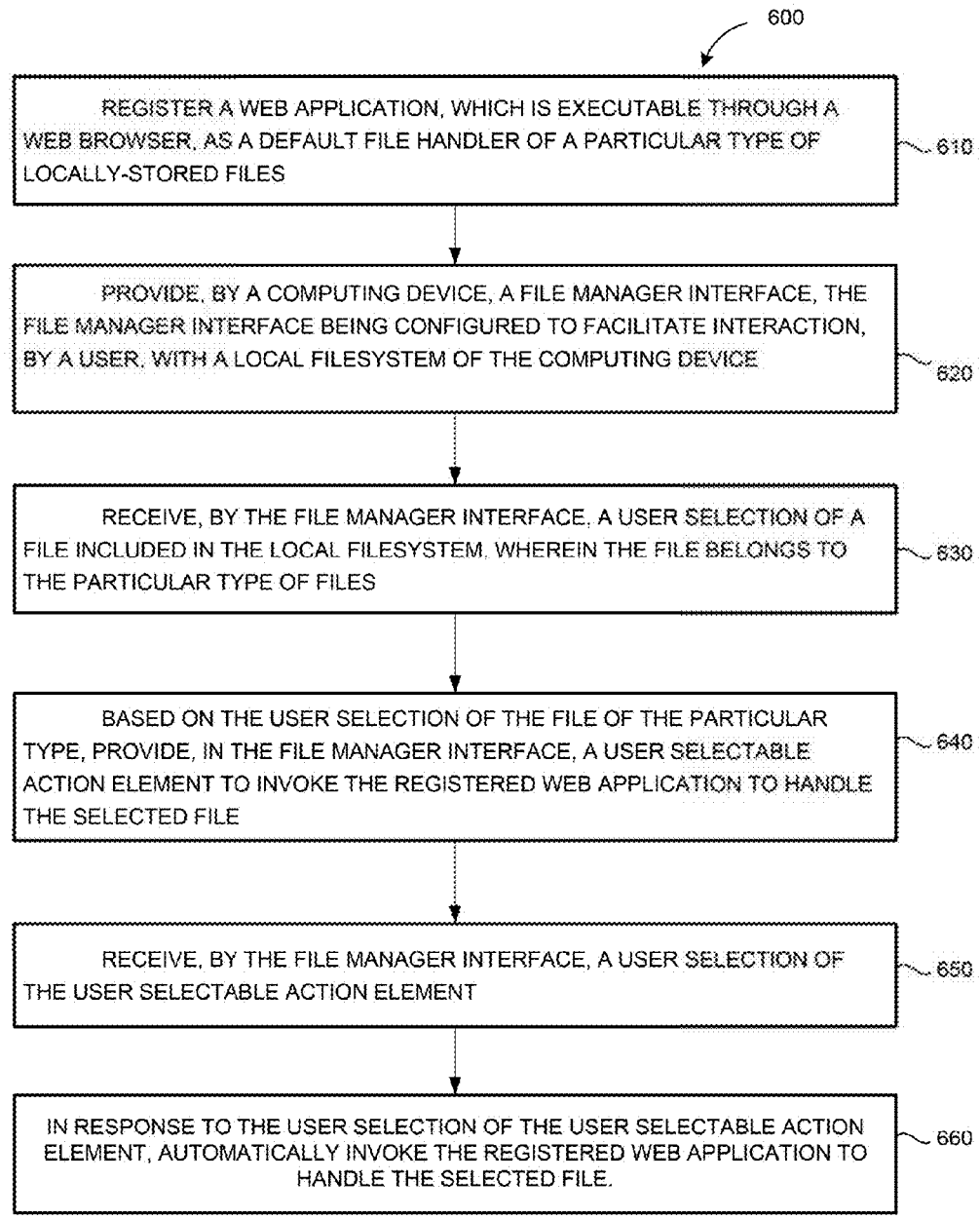
FIG. 6 is a is a flowchart illustrating a method for providing remotely stored content secure access to locally stored information in accordance with an example implementation.

FIG. 6 is a flowchart illustrating a method 600 for providing remotely stored content secure access to locally stored information in accordance with an example implementation. The method 600 may be implemented in the network 100 using the approaches described herein. Accordingly, for purposes of illustration, the method 600 will be described with further reference to FIGS. 1-5, as appropriate. It will be appreciated, however, that the method 600 may be implemented in computing networks and using computing devices that have other configurations than those described herein.

As illustrated in FIG. 6, the method 600 includes, at block 610, registering a web application, which is executable through a web browser, as a default file handler of a particular type of locally-stored files. At block 620, the method 600 includes providing, by a computing device, a file manager interface, the file manager interface being configured to facilitate interaction, by a user, with a local filesystem of the computing device. At block 630, the method 600 includes, receiving, by the file manager interface, a user selection of a file included id the local filesystem, wherein the file belongs to the particular type of files. At block 640, the method 600 includes, based on the user selection of the file of the particular type, providing, in the file manager interface, a user selectable action element to invoke the registered web application to handle the selected file. At block 650, the method 600 includes, receiving, by the file manager interface, a user selection of the user selectable action element. At block 660, the method 600 includes, in response to the user selection of the user selectable action element, automatically invoking the registered web application to handle the selected file.

Figure 7:
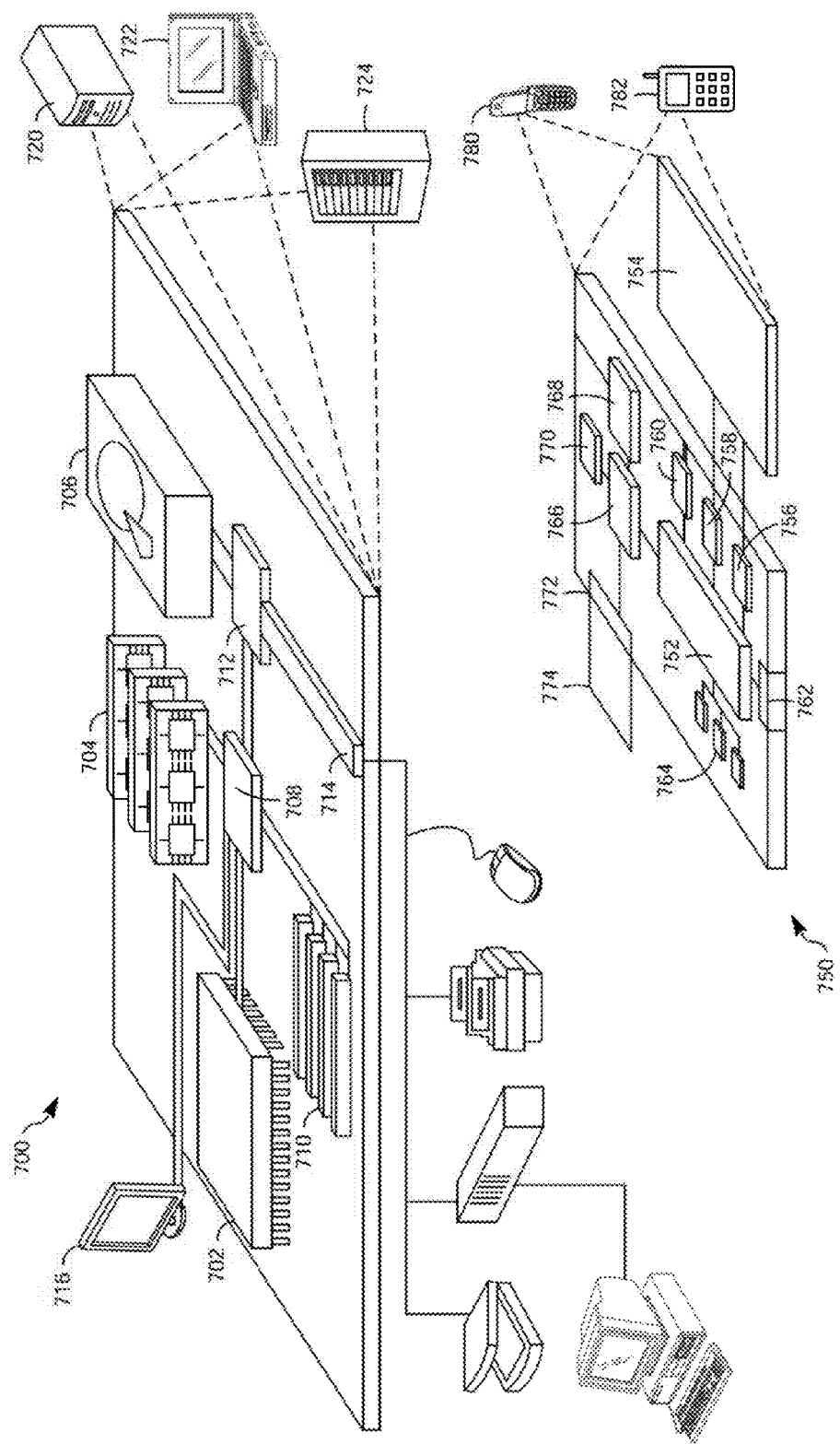
FIG. 7 is a diagram that illustrates a computing device and a mobile computing device that can be used to implement the techniques described herein in accordance with an example implementation.

FIG. 7 is a diagram that shows an example of a genetic computer device 700 and a generic mobile computer device 750, which may be used with the techniques described here. Computing device 700 is intended to represent various forms of digital computers, such at laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementation of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operation is for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 784 may also be provided and connected to device 750 through expansion interface 782, which may include, for example, a SIMM (Single In Line Memory Module) card interface. Such expansion memory 784 may provide extra storage space for device 750, or may also store applications or other information for device 750. Specifically, expansion memory 784 may include instructions to carry out or supplement the processes described above, and may include security information also. Thus, for example, expansion memory 784 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 784, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 780 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through-a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic disks, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) ort CD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing, device that includes a back end component (e.g., as a data server), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and server. A client and server are generally remote from each other and typically interact through a communication network. The relationship of client and server irises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   providing, by a computing device, a file manager interface, the file manager interface being configured to facilitate interaction, by a user, with a local filesystem of the computing device;
   registering a web application, which is executable through a web browser, as a default file handler of a particular type of locally-stored files, the registering comprising modifying a functionality of the file manager interface to allow the registered web application local access to the particular type of locally-stored files, the modifying being based on one or more entries included in a file associated with the registered web application, the one or more entries defining actions that can be performed in association with the particular type of locally-stored files, the modifying including:
  indicating at least one action the web application is allowed to perform on the particular type of locally-stored files; and
  defining a user selectable action element for inclusion in the file manager interface that, when selected, initiates the at least one action by invoking the registered web application;
receiving, by the file manager interface, a user selection of a file included in the local filesystem, wherein the file belongs to the particular type of files;
based on the user selection of the file of the particular type and based on the web application being registered as the default file handler of the selected file, providing, in the file manager interface, the user selectable action element to invoke the registered web application from the file manager interface;
receiving, by the file manager interface, a user selection of the user selectable action element; and
in response to the user selection of the user selectable action element, automatically invoking the registered web application to handle the selected file.

2. The computer-implemented method of claim 1, wherein invoking the registered web application includes opening the web application in the web browser and opening the selected file in the web application.

3. The computer-implemented method of claim 1, wherein invoking the registered web application includes opening the web application in the web browser and uploading the selected file to a server that hosts the web application.

4. The computer-implemented method of claim 1, further comprising:
  determining that the selected file belongs to the particular type based on an extension of a name of the file.

5. The computer-implemented method of claim 1, wherein registering the web application includes executing code, by the computing device, the code indicating the particular type of locally-stored files the registered web application handles.

6. The computer-implemented method of claim 1, wherein the file manager interface comprises a first sandboxed sub-process of a privileged web browser interface.

7. The computer-implemented method of claim 6, wherein handling the selected file includes providing access to the selected file by the web application in a second sandboxed sub-process of the privileged web browser interface.

8. The computer-implemented method of claim 6, wherein access to the selected file by the web application is provided in a sandboxed sub-process of the file manager interface.

9. The computer-implemented method of claim 6, wherein providing the user selectable action element, receiving the user selection of the user selectable action element, and automatically invoking the registered web application to handle the selected file are implemented by an extension of the file manager interface.

10. The computer-implemented method of claim 1, wherein:
  providing the user selectable action element to invoke the registered web application comprises providing a plurality of action buttons corresponding with different registered web applications to invoke the registered web application to handle the selected file; and
  receiving the user selection of the user selectable action element comprises receiving a user selection of one of the plurality of action buttons.

11. The computer-implemented method of claim 1, wherein handling the selected file comprises:
  dynamically assigning the registered web application one or more local file access permissions to the selected file based on the at least one action the web application is allowed to perform on the particular type of locally-stored files; and
  including the assigned one or more local file access permissions in a permissions table associated with the selected file.

12. The computer-implemented method of claim 11, wherein invoking the registered web application includes:
  opening the registered web application in the web browser; and
  processing the selected file with the registered web application; and wherein handling the selected file further comprises:
    dynamically revoking the assigned one or more local file access permissions in response to completion of the processing of the selected file; and
    removing the assigned one or more local file access permissions from the permissions table.

13. The computer-implemented method of claim 11, further comprising:
  receiving, by the file manager interface, a user deselection of the selected file included in the local filesystem; and
  in response to the user deselection of the selected file:
    dynamically revoking the assigned one or more local file access permissions, and
    removing the assigned one or more local file access permissions from the permissions table.

14. The computer-implemented method of claim 13, wherein the access permissions are dynamically assigned and dynamically revoked by a privileged browser process of the computing device.

15. A computing device comprising:
  a data storage device storing files that are accessible via a local filesystem; and
  a non-transitory computer-readable medium having instructions stored thereon, the instructions, when executed by a processor, causing at least one processor of the computing device to:
    provide a file manager interface, the file manager interface being configured to facilitate interaction, by a user, with the local filesystem;
    register a web application, which is executable through a web browser, as a default file handler of a particular type of locally-stored files, the registering comprising modifying a functionality of the file manager interface to allow the registered web application local access to the particular type of locally-stored files, the modifying being based on one or more entries included in a file associated with the registered web application, the one or more entries defining actions that can be performed in association with the particular type of locally-stored files, the modifying including:
      indicating at least one action the web application is allowed to perform on the particular type of locally-stored files; and
      defining a user selectable action element for inclusion in the file manager interface that, when selected, initiates the at least one action by invoking the registered web application;
    receive, by the file manager interface, a user selection of a file included in the local filesystem, wherein the file belongs to the particular type of files;

based on the user selection of the file of the particular type and based on the web application being registered as the default file handler of the selected file, provide, in the file manager interface, the user selectable action element to invoke the registered web application from the file manager interface;

receive, by the file manager interface, a user selection of the user selectable action element; and in response to the user selection of the user selectable action element, automatically invoke the registered web application to handle the selected file.

16. The computing device of claim 15, wherein the data storage device comprises one or more of:
a hard disk drive;
a network share;
a solid-state disk; and
a peripheral data storage device.

17. The computing device of claim 16, wherein the peripheral storage device comprises one of a Universal Serial Bus drive, a Secure Digital memory card, a digital camera and a digital media player.

18. A non-transitory, machine-readable medium having instructions stored thereon, the instructions, when executed by a processor, cause a computing device to:

provide, by the computing device, a file manager interface, the file manager interface being configured to facilitate interaction, by a user, with a local filesystem of the computing device;

register a web application, which is executable through a web browser, as a default file handler of a particular type of locally-stored files, the registering comprising modifying a functionality of the file manager interface to allow the registered web application local access to the particular type of locally-stored files, the modifying being based on one or more entries included in a file associated with the registered web application, the one or more entries defining actions that can be performed in association with the particular type of locally-stored files, the modifying including:

indicating at least one action the web application is allowed to perform on the particular type of locally-stored files; and defining a user selectable action element for inclusion in the file manager interface that, when selected, initiates the at least one action by invoking the registered web application;

receive, by the file manager interface, a user selection of a file included in the local filesystem, wherein the file belongs to the particular type of files;

based on the user selection of the file of the particular type and based on the web application being registered as the default file handler of the selected file, provide, in the file manager interface, the user selectable action element to invoke the registered web application the file manager interface;

receive, by the file manager interface, a user selection of the user selectable action element; and in response to the user selection of the user selectable action element, automatically invoking the registered web application to handle the selected file.

19. The non-transitory, machine-readable medium of claim 18, wherein invoking the registered web application includes opening the web application in the web browser and uploading the selected file to a server that hosts the web application.

20. The non-transitory, machine-readable medium of claim 18, wherein the file manager interface comprises a first sandboxed sub-process of a privileged web browser interface and wherein handling the selected file includes providing access to the selected file by the web application in a second sandboxed sub-process of the privileged web browser interface.

\* \* \* \* \*